United States Patent [19]

Konisi et al.

[11] 3,845,281

[45] Oct. 29, 1974

[54] SYSTEM FOR CORRECTING ERRORS IN PULSE DATA

[75] Inventors: Kenzi Konisi, Osaka; Katumi Iwatani; Tosio Simizu, both of Kyoto, all of Japan

[73] Assignee: Omron Tateisi Electronics Co., Kyoto, Japan

[22] Filed: Feb. 26, 1973

[21] Appl. No.: 335,817

[30] Foreign Application Priority Data
Mar. 1, 1972 Japan.................................. 47-21213

[52] U.S. Cl. ...... 235/92 PL, 235/92 R, 235/92 DN, 235/92 TC, 235/33
[51] Int. Cl. .......................................... H03k 21/34

[56] References Cited
UNITED STATES PATENTS
3,209,130   9/1965   Schmidt.......................... 235/92 DL
3,530,284   9/1970   Wood............................. 235/92 PL
3,719,807   3/1973   Daley ............................ 235/92 DL

OTHER PUBLICATIONS 235 92 DL;92 CC

Primary Examiner—Gareth D. Shaw
Assistant Examiner—Robert F. Gnuse
Attorney, Agent, or Firm—Christensen, O'Connor, Garrison & Havelka

[57] ABSTRACT

A system for correcting errors in pulse data which is capable of correcting the errors by adding correction pulses to or subtracting from input data pulses received within a predetermined period of time. The correction pulses are evenly distributed within the predetermined period of time so as to be added to or subtracted from the data pulses.

11 Claims, 4 Drawing Figures

SYSTEM FOR CORRECTING ERRORS IN PULSE DATA

This invention relates to a system for correcting errors in pulse data. Although not restricted thereto, the system of the invention can advantageously be applied to a taximeter.

In recent years there have been developed taximeters of an electronic type wherein electric pulses are employed to calculate the taxi fare. In this type of taximeter a pulse generator produces one pulse upon every one revolution of the wheel of a taxi. If the distance corresponding to one revolution of the wheel is known, it is possible to know the distance travelled by the taxi by counting the number of pulses produced by the pulse generator. However, the distance corresponding to one revolution of the wheel varies with the diameter of the wheel, so that the number of pulses produced when the same distance has been travelled varies with the diameter of the wheel. To compensate for differences in wheel diameter, the number of pulses produced when a predetermined distance has been travelled by a taxi having wheels of a predetermined diameter is taken as a standard or reference, and the number of pulses produced when the same distance has been travelled with wheels of a different diameter is counted and compared with the reference number. If the number obtained differs from the reference or standard number, the difference between the two numbers must be added to or subtracted from the latter number to compensate for the difference every time the distance has been travelled. However, there are difficult problems in such addition or subtraction. Suppose that the above-mentioned distance is relatively long, say, 1 km. If the number of pulses to be added or subtracted are all added or subtracted at the end of 1 km, no correction is made before the distance of 1 km has been travelled. Then, if the passenger gets off the taxi before it has travelled 1 km, the taxi fare has not been properly calculated but contains errors.

The primary object of the invention is to provide a system for correcting errors in input pulses which is capable of correcting the errors within a predetermined period of time by introducing correction pulses uniformly distributed within the period of time.

In one embodiment of the invention, the input pulses are the pulses produced as the wheels of a taxi are rotated. Suppose that with the wheels having a standard diameter, 512 pulses are produced when the taxi travels 1 km. If, with the wheels of a different diameter, 510 or 514 pulses are produced for the same distance of 1 km, the number of correction pulses to be added to or subtracted from the pulses actually produced is two. In accordance with the invention, these two pulses are distributedly added to or subtracted from the actually produced pulses. By "distributedly" it is meant that if two pulses are to be added or subtracted within 1 km, one pulse is added or subtracted when 500 meters have been travelled and then another pulse is added or subtracted within the following 500 meters.

Another object of the invention is therefore to provide such a correcting system as aforesaid, wherein it is possible to freely distribute correction pulses within a predetermined period of time.

Another object of the invention is to provide such a correcting system as aforesaid, which is capable of selectively conducting addition or subtraction of correction pulses.

In accordance with the invention, there is provided a circulating shift register comprising a plurality of stages or cells for counting input data pulses. When a data pulse is registered in a predetermined one of the stages of the shift register, it is determined in accordance with the registration where in a series of input pulses correction pulses should be distributed. The intervals between the distributed correction pulses are substantially equal. Therefore, during the period of time in which a predetermined number of input pulses are counted correction pulses are evenly distributed so as to be added to or subtracted from the input pulses. When a correction pulse is produced, one input pulse to be entered into the circulating shift register is converted to a pulse having a weight corresponding to that of two input pulses. For example, if the arrangement is such that 512 input pulses are applied to the circulating shift register while the distance of 1 km is travelled by the taxi, and that one correction pulse is produced during the period of time in which 512 input pulses are registered in the shift register, one correction pulse is produced when 256 input pulses have been registered, so that the two hundred and fifty-seventh pulse will have a weight corresponding to that of two input pulses. Therefore, when 511 or 513 pulses have actually been registered in the shift register, the contents of the shift register is equivalent to 512 pulses.

The invention will be described in detail with reference to the accompanying drawings, wherein.

Figure 1:
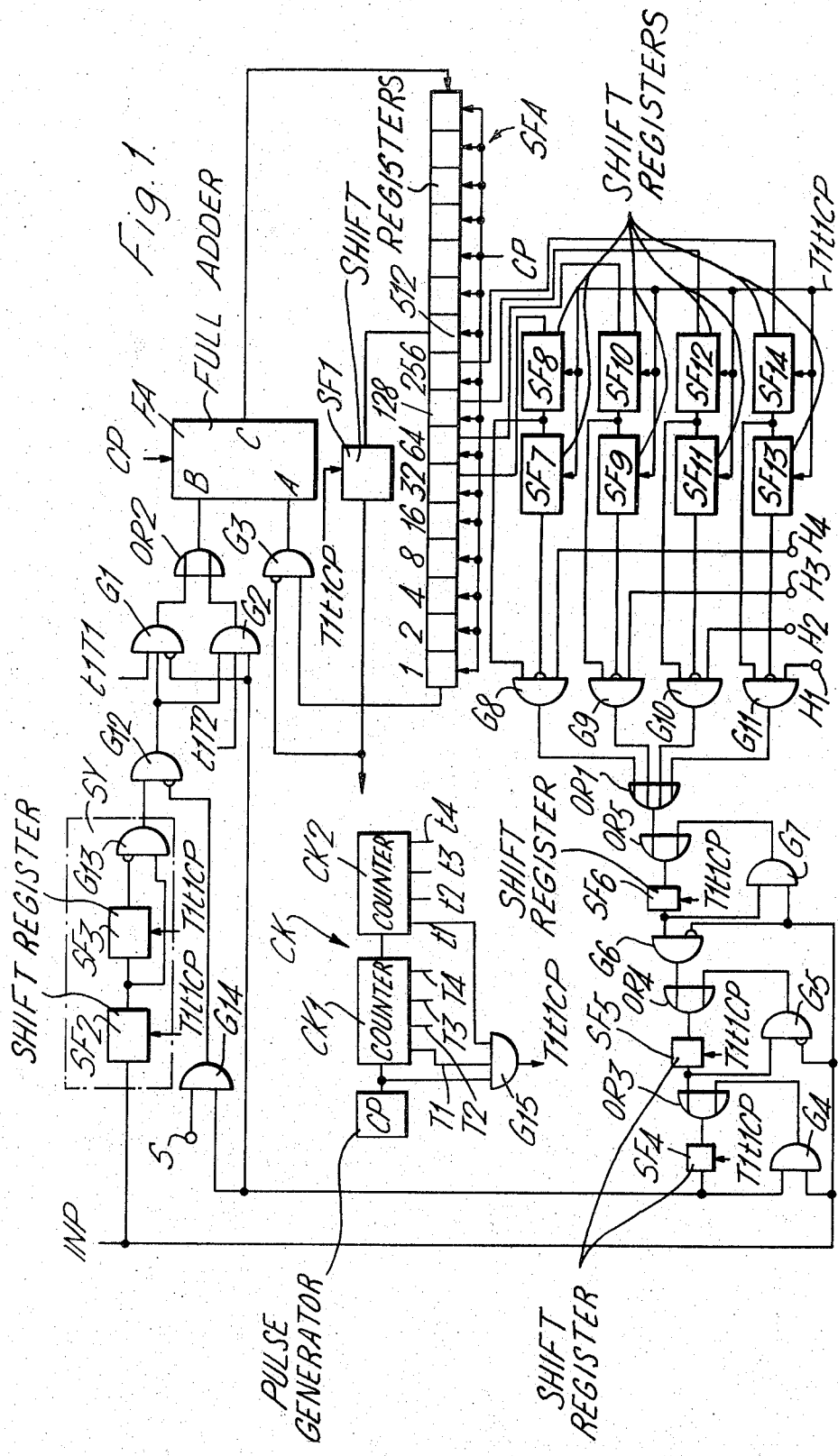
FIG. 1 is a block diagram of one embodiment of the invention.

Referring to the drawings, first to FIG. 1, there is shown a clock signal generator CK comprising two pulse counters CK1 and CK2. A clock pulse generator CP supplies a series of pulses (which will also be referred to as CP) to the counter CK1, which produces an output successively on four output terminals T1 – T4. Upon receipt of the fifth clock pulse, the counter CK1 produces a carry output to be applied to the counter CK2. Initially the counter CK2 has an output at the terminal $t1$. Every time the counter CK2 receives the carry output from the counter CK1, the counter CK2 has its output successively shifted through the terminals $t1 - t4$. In the following description, the output terminals such as $t1 - t4$ and T1 – T4 and the signals on the terminals will be designated by the same reference symbols. The outputs T1 – T4 are used as the bit timing signals and the outputs $t1 - t4$, as the digit timing signals.

A sixteen-bit circulating shift register SFA conducts read-in and -out in synchronism with the clock pulses CP. A full adder FA adds the input signals applied to its two input terminals A and B and produces an output corresponding to the sum of the inputs at its output terminal C.

Figure 2:
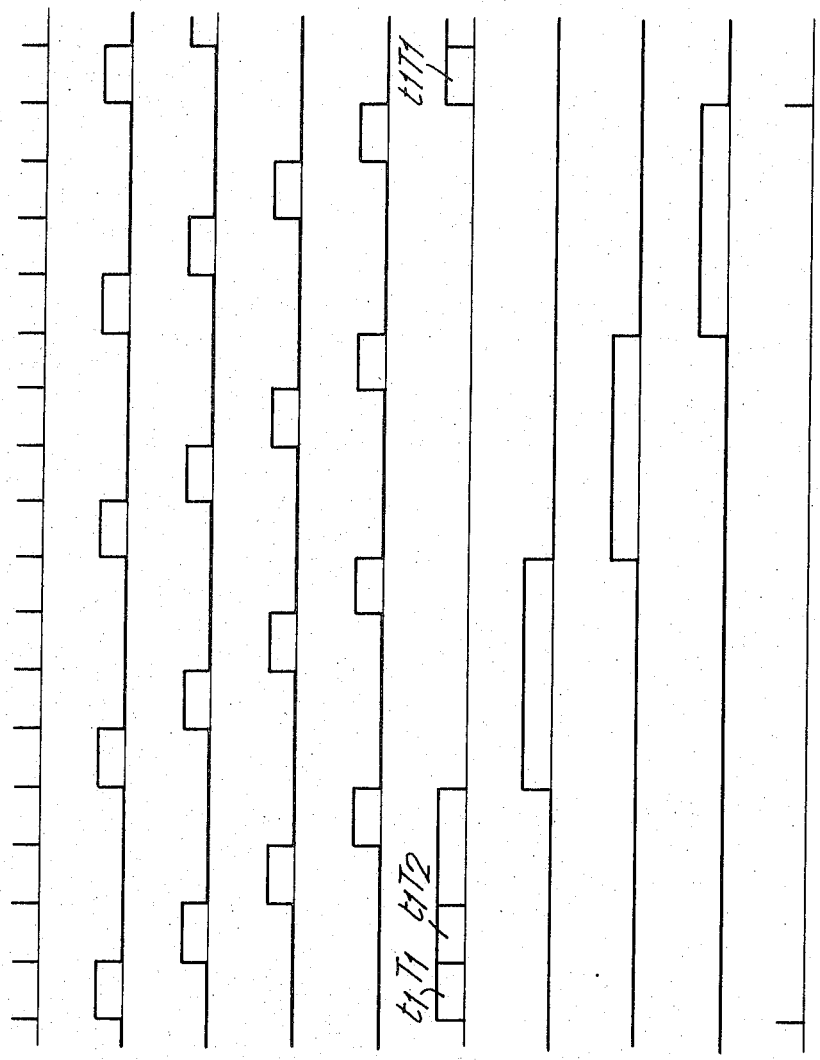
FIG. 2 shows waveforms of the timing signals used in the system of FIG. 1.

FIG. 2 shows the relation between the clock pulse CP and the timing signals T1 – T4 and $t1 - t4$ and T1$t$1CP. As shown, the timing signal $t$1T1 is that part of the signal *t*1 which corresponds to the time of duration of the signal T1. Similarly, the signal *t*1T2 is that part of the signal *t*1 which corresponds to the time of duration of the signal T2. The signals *t*1T1 and *t*1T2 are obtained when the logical AND condition is satisfied between the signal *t*1 and the signals T1 and T2, respectively. The timing signals T1*t*1CP are obtained through an AND gate G15 when the pulse CP and the signals T1 and *t*1 coincide. In synchronism with the signal T1*t*1CP, fourteen one-bit registers SF1 – SF14 conduct read-in and -out.

Input data pulses INP may for example be those which are produced once for every one revolution of the wheel of a taxi. The width of the pulse INP is far greater than that of the clock pulse CP. The pulses INP are applied to a synchronizing circuit SY comprising the one-bit registers SF2 and SF3 and a gate G13. The pulses INP are applied to the register SF2. The output of the register SF2 is applied as one input to the gate G13, to which the output of the register SF3 is applied as an inhibit input, so that so long as the output of the register SF3 is applied to the gate G13, the gate produces no output even when the output of the register SF2 is applied to the gate.

As previously mentioned, since the registers SF2 and SF3 operate read-in and -out, when an input data pulse INP is applied to the synchronizing circuit SY, the circuit produces an output from the time the first pulse T1*t*1CP is applied to the register SF2 to the time the next pulse T1*t*1CP is applied to the register SF3. In other words, the synchronizing circuit SY converts each input data pulse to a pulse having a width equal to the interval of the timing signals T1*t*1CP.

The output of the gate G13 is applied as one input to an AND gate G12, which receives as the other input the output of an AND gate G14, to which the output of the register SF4 is applied as one input. Suppose that the output of the register SF4 is now "0." The output of the circuit SY, which has been obtained through conversion of the input data pulse INP, is then applied as one input to AND gates G1 and G2 through gate G12. The timing signals *t*1T1 and *t*1T2 are applied as a second input to the gates G1 and G2, respectively. The output of the register SF4 is applied as an inhibit input to the gate G1 and as a third input to the gate G2. Therefore, if the output of the register SF4 is "0," when the gate G12 produces an output, the gate G1 produces an output only when the timing signal *t*1T1 is applied thereto. This means that one input data pulse INP is converted to one timing signal *t*1T1.

The output of the gate G1 is applied to the input terminal B of the full adder FA through an OR gate OR2. At this time the input at the other terminal A is "0," so that the output C of the adder FA is applied to that one of the 16 stages of the circulating shift register SFA which is at the right-hand end thereof. The data stored is shifted leftward to the stage at the left-hand end of the register while 16 clock pulses CP have been produced, and upon production of the seventeenth clock pulse CP, the data in the left-hand end stage is circulated through the AND gate G3 and the adder FA. Therefore, whenever an input data pulse INP comes, the timing signal *t*1T1 obtained through conversion of the pulse INP is added to the data already stored in the register SFA. In other words, every time one input data pulse INP has arrived, the shift register SFA has one data pulse added to the data stored therein.

When 32 input pulses INP have come, the register SFA has a signal "1" registered in the sixth stage from the left. This signal is kept registered therein until 64 pulses INP have come. When 96 pulses INP have come, a signal "1" is again registered in the same stage and remains registered until 128 pulses have come. In other words, the registration in the stage continues for a period corresponding to 32 input data pulses INP and is repeated with an interval corresponding to 32 input data pulses.

The same is true with the seventh stage, wherein the registration continues for a period corresponding to 64 input pulses INP and is repeated with an interval corresponding to 64 input pulses INP. In the eighth stage, the registration continues for a period corresponding to 128 input pulses INP and is repeated with an interval corresponding to 128 pulses INP, and in the ninth stage the registration continues for a period corresponding to 256 pulses INP and is repeated with an interval corresponding to 256 pulses INP.

The contents of the sixth to ninth stages are applied to the registers SF8, SF10, SF12 and SF14, respectively. The outputs of these registers are applied to the registers SF7, SF9, SF11 and SF13, and also to AND gates G8, G9, G10 and G11, respectively. The outputs of the registers SF7, SF9, SF11 and SF13 are applied as an inhibit input to the gates G8 – G11, respectively, to which a selection signal is applied as another input through terminals H1 – H4, respectively. The outputs of the gates G8 – G11 are applied to an OR gate OR1.

Figure 3:
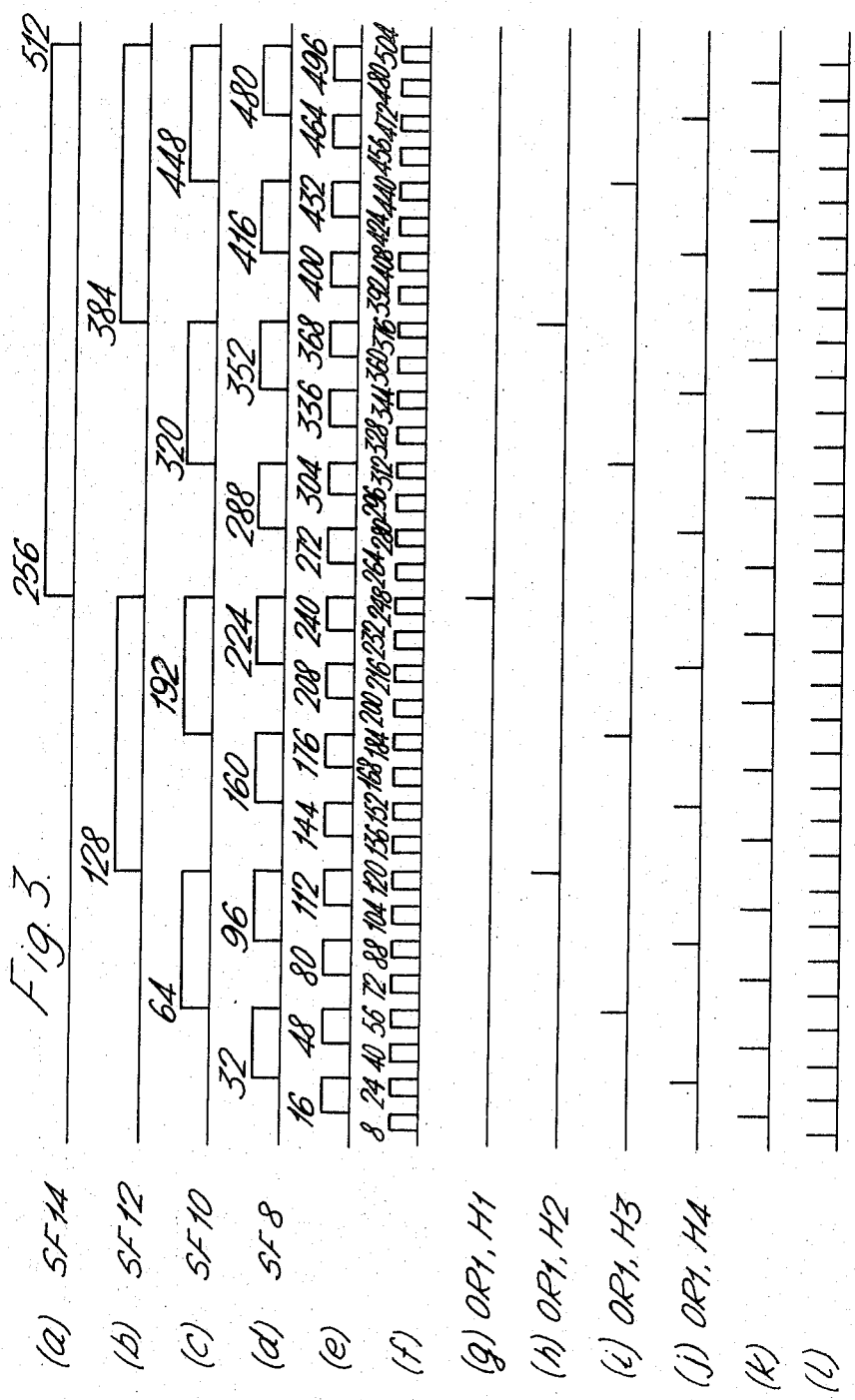
FIG. 3 shows distribution of correction pulses for explanation of the operation of the system of the invention.

FIG. 3 shows the outputs of the registers SF14, SF12, SF10 and SF8 as (*a*) – (*d*), respectively, and the outputs of the OR gate OR1 as (*g*) – (*i*) as the selection signal is applied to the terminals H1 – H4, respectively. In case the fourth and fifth stages of the register SFA are used, the outputs produced by a register corresponding to the register SF8 are designated by (*e*) and (*f*), respectively. The outputs produced by the OR gate OR1 in response to the signals (*e*) and (*f*) are designated by (*k*) and (*l*), respectively.

Since the output of the register SF7 is applied as an inhibit input to the gate G8, if a signal is applied to the terminal H4, the output of the gate G8 continues for one cycle of the timing signal T1*t*1CP (that is, corresponding to 16 clock pulses CP). FIG. 3 (*j*) shows the output pulses produced by the OR gate OR1 in response to the output of the gate G8. As will be easily understood from the waveform, when a signal is at the terminal H4, the OR gate OR1 produces 8 pulses when 512 pulses INP have been applied, and the cycle of the pulses from the OR gate corresponds to 64 input data pulses INP. In other words, the pulses from the OR gate OR1 are substantially evenly distributed during the period of time corresponding to 512 input pulses INP.

Similarly, if a signal is applied to the terminals H3, the OR gate OR1 produces four pulses during the period of time in which 512 pulses INP are applied. The four pulses are substantially evenly distributed in the period of time as shown in FIG. 3(*i*). If a signal is applied to both the terminals H1 and H2, the OR gate OR1 produces three pulses as shown in FIG. 3(*g*) and (*h*). Thus, by applying a signal selectively to one or more of the terminals H1 – H4, it is possible to selectively provide 0 through 15 pulses as the output of the gate OR1 during the period of time corresponding to 512 input data pulses INP, and these pulses obtained from the OR gate OR1 are substantially evenly distributed in the period of time of 512 input data pulses. The pulses obtained through the OR gate OR1 are used for correction of errors as will be presently described.

Figure 4:
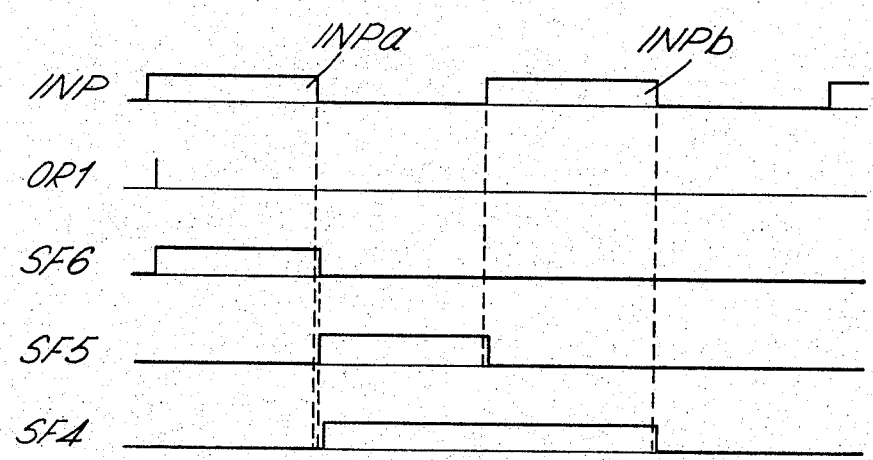
FIG. 4 shows waveforms for explanation of how the correction pulses are produced.

Referring to FIGS. 1 and 4, suppose that upon arrival of one input data pulse INPa, the gate OR1 has produced one correction pulse. This correction pulse is applied to the register SF6 through an OR gate OR5. The output of the register SF6 is applied as one input to AND gates G6 and G7. The input data pulse INPa is also applied as the other input to the AND GATE G7, which produces an output to be applied back to the OR gate OR5. Therefore, when the input pulse INPa and consequently the output of the AND gate G7 disappear, the output of the register SF6 disappears. In practice, the output of the register SF6 is caused to disappear a period of time corresponding to one timing pulse T1$t$1CP after the disappearance of the input data pulse INPa. As a result, the gate G6 produces an output for a period of time corresponding to one timing pulse T1$t$1CP, and the output is applied to the register SF5 through an OR gate OR4, Then, upon lapse of a time corresponding to one timing pulse T1$t$1CP the register SF5 produces an output to be applied to the register SF4 through an OR gate OR3 and also as an input to an AND gate G5. The input data pulse INP is applied as an inhibit input to the gate G5. However, at this time the pulse INPa has already disappeared, so that the gate G5 with no inhibit input thereto produces an output to be applied back to the registers SF5 through the OR gate OR4. The output of the AND gate G5 continues till the next input data pulse INPb is applied thereto.

The output of the register SF5 causes the next register SF4 to produce an output to be applied as one input to an AND gate G4. Upon arrival of the input pulse INPb the output of the register SF5 disappears. At this time, however, the input pulse INPb is also applied to the AND gate G4, which produces an output to be applied back to the register SF4 through the OR gate OR3. Therefore, even when the input data pulse INPb comes, the output of the register SF4 does not disappear. However, when the input pulse INPb disappears, the output of the AND gate G4 disappears, so that upon lapse of a time corresponding to one timing pulse T1$t$1CP after that, the output of the register SF4 disappears.

The output of the register SF4 is applied as one input to the AND gate G2 and an AND gate G14 and as an inhibit input to the AND gate G1. If no signal is at the terminal S, the gate G14 produces no output, so that in response to the input pulse INPb the gate G12 produces an output to the applied to the gates G1 and G2. However, since the output of the register SF4 is being applied as an inhibit input to the gate G1, the gate G1 produces no output even when the timing pulse $t$1T1 is applied to the gate. When the timing pulse $t$1T2 is produced immediately after the timing pulse $t$1T1, the gate G2 produces an output. This means that the input data pulse INPb has been converted to the pulse $t$1T2. This output is applied to the terminal B of the adder FA through the OR gate OR2. Since the timing pulse $t$1T2 lags one bit behind the timing pulse $t$1T1, the input to the terminal B lags one bit behind the output of the gate G1. Therefore, while the data registered in the register SFA by one timing pulse $t$1t1 corresponds to one input data pulse INP, the data registered in the register SFA by one timing pulse $t$1T2 corresponds to two input data pulses INP. In other words, the data that has until then been registered in the register SFA corresponds to one pulse more than the number of input data pulses INP that have until then been produced. This means that with a signal being applied to the terminal H1, when 512 input pulses INP have actually been produced, the contents of the shift register SFA become as if 513 input data pulses had been produced. This one additional pulse is added when 256 input pulses INP, that is, one half of the 513 pulses have been produced.

In the above case, no signal was being applied to the terminal S. With a signal being applied to the terminal S, when the register SF4 produces an output, the AND gate G14 produces an output to be applied as an inhibit input to the gate G12, so that even when the gate G12 receives an input caused by the input data pulse INPb, it produces no output. This means that the pulse INPb is not used as data to be registered in the register SFA. In other words, one input data pulse INP has thus been cancelled, and the data corresponding to one input data pulse INP has been subtracted from the contents of the register SFA. This means that with a signal being applied to the terminal H1, when 513 input data pulses have actually been produced, the contents of the shift register SFA becomes as if 512 pulses had been produced. The one pulse to be subtracted is subtracted when 256 input data pulses, that is, one half of 512 pulses have been produced.

As can be easily understood, the number of correction pulses to be provided is determined by selectively applying a signal to the terminals H1 – H4 and whether addition or subtraction of the correction pulses to or from the contents of the shift register SFA should be conducted is determined by whether a signal is applied to the terminal S, and the correction of the contents of the register SFA is conducted at substantially equal intervals within the period of time in which 512 input pulses INP are produced.

When the contents of the register SFA become 512, it produces an output to be applied to the register SF1, the output of which is in turn applied as an inhibit input to the gate G3, so that with the output of the adder FA being "0," the register SFA is shifted by the clock pulses CP. When 16 clock pulses CP have been applied to the register SFA, it is cleared of the contents.

Thus, in accordance with the invention, the correction pulses can be distributed substantially evenly within a predetermined period of time (corresponding to 512 input data pulses in the illustrated embodiment). It is therefore possible to effect uniformly distributed correction of the errors and to obtain evenly corrected pulse data at any point.

Since correction is uniformly conducted, it is not necessary to shorten the period of time within which errors are to be corrected, so that by selecting a suitable period of time for correction it is possible to minimize the unit of correction.

What we claim is:

1. A system for correcting errors in the detection of distance travelled by a taxi, the errors being caused by deviation of the diameter of the wheels of the taxi from a standard diameter, comprising:

timing signal producing means for producing first, second and third control signals, a predetermined number of second control signals occurring between successive third control signals, said first control signal being initiated in time coincident with each third control signal, and lasting until the next occurrence of said second control signal;

pulse data input means for producing distance pulses upon rotation of the wheels of the taxi;

first gating means operative in response to said first control signal for converting said distance pulses into timing pulses;

a circulating shift register having an input and an output and comprising a plurality of series-connected bistable elements, wherein said circulating shift register is responsive to said second control signal for storing an accumulated count of said timing pulses, and circulating said accumulated count;

adder means for adding a timing pulse from said first gating means to said accumulated count of timing pulses as said accumulated count is circulated from the output of said circulating shift register, said adder means thereby providing a new accumulated count;

means applying said new accumulated count to the input of said circulating shift register;

pulse producing means responsive to said third control signals for producing correction pulses when predetermined counts have been reached in said circulating shift register;

means for selecting at least one of said correction pulses;

means for generating an addition command and a subtraction command; and correction circuit means responsive to said selected correction pulses and to one of said addition and subtraction commands to alter the application of timing pulses to said adder means, wherein said accumulated count is increased when said addition command is generated, and wherein at least one of said timing pulses is eliminated when said subtraction command is generated.

2. An apparatus of claim 1, wherein said circuit means includes a second gating means responsive to said addition command for passing said distance pulses to said first gating means and responsive to said subtraction command to prevent said distance pulses from reaching said first gating means, a third gating means operative in response to said circuit means for converting one timing pulse to a signal which, when applied to said adder means, increases the accumulated count by at least two, and further includes means for inhibiting said first gating means when said third gating means is operative.

3. An apparatus of claim 1, wherein said pulse producing means includes a plurality of serially connected pairs of bistable elements, each serially connected bistable element having an input and an output, the input of one bistable element in each of said pairs of bistable elements being connected to a predetermined one of said plurality of bistable elements in said circulating shift register, each of said pairs of bistable elements being controlled by said third control signal.

4. An apparatus of claim 3, wherein said selecting includes means generating a selection command, and a plurality of fourth gating means, the output of the other bistable element in each of said pairs of bistable elements being connected to one of said plurality of fourth gating means, said selection command energizing a selected one of said plurality of fourth gating means, each of said plurality of fourth gating means when energized producing a fourth gate pulse having a duration equal to one cycle of said third control signal, and further includes a fifth gating means for passing the fourth gate pulses in the absence of distance pulses.

5. An apparatus of claim 4, wherein said fifth gating means includes a first bistable circuit having set and reset conditions for storing said fourth gate pulses, a second bistable circuit having set and reset conditions adapted to be set by said third control signal when said first bistable means is set and in the absence of distance pulses, and adapted to be reset by said third control signal when said distance pulses are present, and a third bistable circuit having set and reset conditions adapted to be set by said third control signal when said second bistable circuit is set, and adapted to be reset when said distance pulses are absent.

6. An apparatus for correcting errors in the detection of distance travelled by a taxi, wherein detected distance is proportional to the number of revolutions of a taxi wheel, comprising:

pulse generating means for producing distance pulses upon rotation of the taxi wheel, said distance pulses having a pulse rate proportional to the rotational speed of the taxi wheel;

first gating means for converting said distance pulses into first timing pulses;

circulating counter means having an input and output and comprising a plurality of series-connected bistable elements for providing an accumulated count of said first timing pulses;

signal means for circulating said accumulated count from said input to said output at a predetermined rate;

means having first and second inputs for adding each successive first timing pulse from said first gating means to the accumulated count;

means for applying said accumulated count to said adding means first input;

means for applying said first timing pulses to said adding means second input;

means for synchronizing the application of the accumulated count and successive first timing pulses to said adding means such that said adding means increases the accumulated count by one for each first timing pulse, thereby providing a new accumulated count;

means for applying said new accumulated count to said input of aid circulating counter means;

means responsive to predetermined counts reached in said counter means to generate correction pulses; and circuit means responsive to said correction pulses to delay one of said first timing pulses sufficiently that the accumulated count is increased by more than one by said adding means.

7. An apparatus of claim 6, wherein said circuit means includes means for generating second timing pulses substantially equal in width to said first timing pulses and synchronized with respect to the application of said accumulated count to the adding means such that the accumulated count is increased by two upon application of said second timing pulse to said adder means, and further includes means for deleting one of said first timing pulses, when one of said second timing pulses is applied to said adder means.

8. An apparatus of claim 6, wherein said synchronizing means includes means for generating a synchronizing signal which is substantially coincident in time with the presence of the least significant digit of said accumulated count at said output of said circulating counter means.

9. An apparatus of claim 6, including means for generating a subtraction command, and wherein said circuit means includes means responsive to said subtraction command and said correction pulses to delete one of said first timing pulses from said first gating means.

10. An apparatus of claim 9, including means for clearing said circulating counter means after a selected accumulated count is reached, and wherein said correction pulse generating means includes means for generating a plurality of sets of correction pulses, each set of correction pulses comprising a plurality of correction pulses separated by a predetermined count of said circulating counter means.

11. An apparatus of claim 10, including means for selecting at least one of said plurality of sets of correction pulses, and means for applying said selected sets of correction pulses to said circuit means, said circuit means generating a second timing pulse in response to each correction pulse, unless said subtraction command is present, said circuit means being responsive to said subtraction command and each correction pulse to delete one first timing pulse.

* * * * *

PO-1050
(5/69)

UNITED STATES PATENT OFFICE
CERTIFICATE OF CORRECTION

Patent No. 3,845,281    Dated October 29, 1974

Inventor(s) Kenzi Konisi, Katumi Iwatani, Tosio Simizu

It is certified that error appears in the above-identified patent and that said Letters Patent are hereby corrected as shown below:

Delete the present title "SYSTEM FOR CORRECTING ERRORS IN PULSE DATA" and substitute therefor --A SYSTEM FOR CORRECTING ERRORS IN THE DETECTION OF DISTANCE TRAVELLED BY A TAXI--.

Signed and sealed this 24th day of December 1974.

(SEAL)
Attest:

McCOY M. GIBSON JR.
Attesting Officer

C. MARSHALL DANN
Commissioner of Patents